Patented May 25, 1926.  1,586,121

UNITED STATES PATENT OFFICE.

WINFIELD SCOTT, OF AKRON, OHIO, ASSIGNOR TO THE RUBBER SERVICE LABORATORIES CO., OF AKRON, OHIO, A CORPORATION OF OHIO.

RUBBER-VULCANIZATION ACCELERATOR.

No Drawing.   Application filed September 9, 1925.  Serial No. 55,386.

The present invention is directed to the art of producing vulcanized rubber. The invention is particularly concerned with the manufacture of a vulcanized rubber composition of commercial value and importance by employing as an accelerator of the vulcanization process, a new type of compound for this purpose as is hereinafter fully set forth and described.

It is well known in chemistry that the aldehydes and particularly the aliphatic aldehydes, react with certain types of organic compounds such as the amines and certain amino derivatives and the like to produce new materials known as condensation products. These products are commonly termed Schiff's bases. Not only do aldehydes react in this manner with the primary amino compounds, but they will likewise combine or condense with the secondary amines.

Thus, one molecular proportion of a secondary amino compound, for example, 85 parts of piperidine, may be combined with an aldehyde in its simple or polymeric form, for example with tri-oxy-methylene, in an amount equivalent to ½ molecular proportion of formaldehyde. This quantity will be approximately 15 parts, if paraformaldehyde be used. This reaction may be carried out in the presence of a suitable solvent or without the use of a solvent, as desired. In either case, a reaction follows at once, and complete combination of the materials with the separation of water of condensation, takes place. The product, in the case of the compounds hereinbefore mentioned, is an oily liquid, having a boiling point of about 237° centigrade and a formula that is substantially as follows: $C_5H_{10}N-CH_2-N.C_5H_{10}$. This compound will react with carbon bisulfid, for example, in an amount equivalent to one molecular proportion thereof, to produce a product which is oily in nature, but which, upon seeding with a crystal or otherwise suitably treating, changes into a crystalline form.

The carbon bisulfid reaction product of the condensation product of other secondary amines, and particularly of other cyclic amines preferably containing a nitrogen atom in the ring, with aldehydes may be prepared in a similar manner. Thus, in place of piperidine mentioned, di-ethylene-di-amine, pyrollidine, piperazine, hydroquinoline, alkyl derivatives such as $\alpha$ or $\beta$-piperidine, the alkyl derivatives of cyclic amines, tetra-hydro-quinaldine, the dialkylamines such as diethyl-amine and di-benzyl-amine and other secondary aliphatic and aromatic amines as well as hydro-collidine and other compounds present in commercial pyridine may be used. These various compounds and other related materials may be combined in the proportions stated or in other proportions if desired, with aldehydes such as formaldehyde, or acetaldehyde and their polymeric forms, or with propionaldehyde, butraldehyde, iso-valeric aldehyde and other aliphatic aldehydes, with acrolein or crotonaldehyde or other unsaturated aldehydes, with oxy-aldehydes such as aldol, or with aromatic aldehydes such as benzaldehyde, cinnamic aldehyde and the like or with ring compounds such as furfuraldehyde, and the product reacted with carbon bisulfid in the manner as described.

Any of the compounds hereinbefore described and particularly the carbon bisulfid reaction product of the condensation product of piperidine and formaldehyde prepared in the manner as described, may be used as accelerating agents of the vulcanization of rubber. The accelerators named are extremely rapid in their action, and may be used advantageously in so called cold cure cements. The accelerators likewise may be employed in heat cured rubber goods as is shown by the following examples. One such composition may be used as a friction stock for a tire and comprises 100 parts of pale crepe rubber, 5 parts of zinc oxide, 2.5 parts of sulfur and 0.2 parts of one of my new accelerators of the class described such as the compound formed by the reaction of carbon bisulfid upon the condensation product of piperidine and formaldehyde.

Such a composition as that just described may be prepared in the usual and well known manner of plasticizing or breaking down the rubber on the differential mixing mills and then mixing homogeneously therein the filler, vulcanizing agent and accelerator. The composition is then cured under pressure in molds for a period of time necessary to give a commercial vulcanized product depending on the pressure employed. A series of cures resulting from vulcanization tests carried out at different pressures is shown in the following table:

| Time of cure. | Steam pressure employed (lbs./sq. in.) | Temperature of cure | Tensile strength at elongation of— | | | | Ultimate elongation. |
|---|---|---|---|---|---|---|---|
| | | | 300% | 500% | 700% | Break. | |
| | | Deg. | | | | | |
| 1 hour | 5 | 228 | 151 | 397 | 1533 | 3425 | 840 |
| 2 hours | 5 | 228 | 221 | 509 | 2210 | 3690 | 820 |
| 3 hours | 5 | 228 | 236 | 568 | 2400 | 4100 | 800 |
| 30 minutes | 10 | 240 | 178 | 364 | 1398 | 3175 | 853 |
| 1 hour | 10 | 240 | 212 | 443 | 1845 | 3850 | 838 |
| 1½ hours | 10 | 240 | 233 | 510 | 2083 | 3815 | 810 |
| 2 hours | 10 | 240 | 241 | 563 | 2120 | 3865 | 810 |
| 5 minutes | 40 | 287 | 134 | 237 | 693 | 2495 | 930 |
| 10 minutes | 40 | 287 | 169 | 349 | 1080 | 2915 | 875 |
| 15 minutes | 40 | 287 | 167 | 355 | 1130 | 3085 | 875 |
| 20 minutes | 40 | 287 | 192 | 367 | 1220 | 2935 | 850 |

It is apparent from the above examples that a vulcanized rubber of high quality results from the use of my new type of accelerators under varying conditions. Thus, in the case of the composition shown, a product of excellent characteristics is obtained by vulcanizing for approximately 15 minutes at 40 pounds of steam pressure per square inch; in about one hour at 10 pounds of steam; and in about 3 hours when cured under 5 pounds of steam pressure.

Other rubber compositions may likewise be prepared by employing any of my new type of accelerators. Thus, a semi-translucent stock that may be used in the manufacture of druggist sundries, such as hot water bottles, nipples, etc. may be prepared from a mixture comprising 100 parts of pale crepe rubber, 0.5 parts of zinc oxide, 1.5 parts of sulfur and 0.5 parts of one of my new accelerators of the type set forth herein. This mixture will yield a commercial product when vulcanized for approximately 25 minutes under the pressure of approximately 20 pounds of steam per square inch.

The accelerators as herein described may likewise be employed in the manufacture of a hard rubber. Thus, for example, 100 parts of pale crepe rubber, 150 parts of zinc sulfid, 5 parts of zinc oxide, 70 parts of sulfur and 2 parts of any of my preferred class of accelerators may be mixed together in the usual manner and cured for a period of approximately one hour and 45 minutes at a pressure of 40 pounds of steam per square inch. A bright red hard rubber of high quality may be obtained by incorporating into the above composition substantially 20 parts of a suitable coloring material, such as a naphthalamine color. Other dyes may, of course, be used if desired.

The accelerators herein described are sufficiently rapid in their action to produce a cure in a cement composition. Thus, a mixture of 100 parts of pale crepe rubber, 3.5 parts of sulfur, 5 parts of zinc oxide and 0.5 parts of accelerator will produce a cement which will cure at room temperature upon standing for a suitable period of time. Other uses of my preferred type of accelerator are apparent from the examples hereinbefore described.

It is also apparent from the examples hereinbefore given that other compounds comprising my preferred type of accelerators may be readily manufactured. Thus, for example, I may combine di-benzyl-amine, dissolved in any suitable solvent or not, as desired, in the proportion of two molecular proportions thereof with one molecular proportion of paraformaldehyde and obtain a white crystalline product melting at substantially 99° centigrade. This product may be dissolved in a solvent such as ether and combined with an equal molecular proportion of carbon bisulfid whereupon there is obtained a product which upon recrystallization from ligroin, melts at approximately 64° C. This product, when incorporated into a rubber mix comprising 100 parts of pale crepe rubber, 5 parts of zinc oxide, 2.5 parts of sulfur and 0.4 parts of accelerator, will yield a satisfactory commercial product when vulcanized for approximately one hour at a temperature of about 240° F. which is substantially that given by 10 pounds of steam pressure per square inch.

Another type of product included within the scope of my present invention may be conveniently prepared by reacting two molecular proportions of a di-amine, such as di-ethyl-amine, di-benzyl-amine and analogous compounds with one molecular proportion of paraformaldehyde or a like material. This reaction may be carried out with or without the use of a solvent as desired, but it is necessary that the mixture be kept from becoming too hot as the product formed is comparatively low boiling. The product, which is probably tetra-ethyl-di-amino-methane is a liquid which is slightly soluble in the water separating out from the reaction mixture. To the product obtained as described, there is added one molecular proportion of carbon bisulfid. This reaction may be carried out with or without the use of a solvent as desired, but if no solvent be used, the mixture should preferably be maintained below the boiling point of the product formed. The product, which is a liquid, may be incorporated into a rubber mix comprising 100 parts of rubber, preferably although not necessarily pale crepe rubber, 5 parts of zinc oxide, 2.5 parts of sulfur and 0.2 parts of the product mentioned, and the mix cured in a press at a temperature of approximately 240° F. for a period of about one hour. A vulcanized product results which has a tensile strength of about 3355 pounds per square inch and an ultimate elongation of about 795%.

Another product having desirable rubber vulcanization accelerating properties may be prepared by reaction two molecular proportions of piperidine with one molecular proportion of furfuraldehyde and combining the product so obtained with one molecular proportion of carbon bisulfid. The tarry product when combined in the proportion of 0.2 parts with 100 parts of rubber, 5 parts of zinc oxide, and 2.5 parts of sulfur, and the mixture cured in a steam press at a temperature of approximately 240° F. (10 pounds gage pressure) gives a vulcanized product having a tensile strength of about 2400 pounds per square inch.

If propionaldehyde be used in place of furfuraldehyde in the example as shown above, and the product reacted with carbon bisulfid to produce an accelerator in the manner as described, the resulting product, when combined in a rubber mix in the proportion of 0.2 parts accelerator, with 100 parts of rubber, 5 parts of zinc oxide and 2.5 parts of sulfur and the mix cured in a steam press at a temperature of approximately 240° F. (10 pounds steam gage pressure) for a period of about one hour, will yield a vulcanized rubber having a tensile strength of approximately 2478 pounds per square inch and an ultimate elongation of about 875%.

It is to be understood that my invention is not limited by any theory set forth in explanation of the facts involved nor are the examples given to be considered as limitative of my invention. For example, it is within the scope of my invention, when my preferred compounds are used in the acceleration of a so-called cold cure or rubber cement, that instead of using the accelerators in the form as disclosed, I may use the reaction product of the aldehyde and the imino compound and add this compound to a rubber compound wherein carbon bisulfid is present in or is used as the carrier liquid in the cement. By such a process, my new class of compounds are formed in situ and exert their accelerating powers as formed. Other means of using the accelerators herein described are apparent to those skilled in the art. It is, of course possible to use other types of rubber than that mentioned in the examples while other fillers may be employed together with or in place of zinc oxide. My invention is, then to be regarded as defined solely by the claims hereinafter set forth wherein I intend to claim all novelty permissible in view of the prior art.

What I claim is:

1. The process of preparing vulcanized rubber which comprises treating rubber and a vulcanizing agent in the presence of the carbon bisulfid derivative of the reaction product of a secondary amine and an aldehyde.

2. The process of preparing vulcanized rubber which comprises heating rubber and a vulcanizing agent in the presence of the carbon bisulfid derivative of the reaction product of a completely hydrogenated cyclic imino compound and an aldehyde.

3. The process of preparing vulcanized rubber which comprises heating rubber and a vulcanizing agent in the presence of the carbon bisulfid derivative of the reaction product of piperidine and an aldehyde.

4. The process of preparing vulcanized rubber which comprises treating rubber and a vulcanizing agent in the presence of the carbon bisulfid derivative of the reaction product of piperidine and an aliphatic aldehyde.

5. The process of preparing vulcanized rubber which comprises treating rubber and a vulcanizing agent in the presence of the carbon bisulfid derivative of the reaction product of piperidine and formaldehyde.

6. The vulcanized rubber product obtained by treating rubber and a vulcanizing agent in the presence of the carbon bisulfid derivative of the reaction product of a secondary amine and an aldehyde.

7. The vulcanized rubber product obtained by treating rubber and a vulcanizing agent in the presence of the carbon bisulfid derivative of the reaction product of a completely hydrogenated cyclic imino compound and an aldehyde.

8. The vulcanized rubber product obtained by treating rubber and a vulcanizing agent in the presence of the carbon bisulfid derivative of the reaction product of piperidine and an aldehyde.

9. The vulcanized rubber product obtained by heating rubber and a vulcanizing agent in the presence of the carbon bisulfid derivative of the reaction product of piperidine and an aliphatic aldehyde.

10. The vulcanized rubber product obtained by heating rubber and a vulcanizing agent in the presence of the carbon bisulfid derivative of the reaction product of piperidine and formaldehyde.

In testimony whereof I affix my signature.

WINFIELD SCOTT.